United States Patent [19]

Dean

[11] Patent Number: 5,293,619
[45] Date of Patent: Mar. 8, 1994

[54] METHOD AND APPARATUS FOR COLLABORATIVE USE OF APPLICATION PROGRAM

[75] Inventor: Craig D. Dean, Sandia Park, N. Mex.

[73] Assignee: Sandia Corporation, Albuquerque, N. Mex.

[21] Appl. No.: 709,925

[22] Filed: May 30, 1991

[51] Int. Cl.⁵ .............................................. G06F 9/06
[52] U.S. Cl. ............................ 395/650; 364/DIG. 1; 364/284
[58] Field of Search ............... 395/700, 275, 375, 650, 395/154, 200, 325, 550; 380/4; 364/423

[56] References Cited

U.S. PATENT DOCUMENTS

| | | | |
|---|---|---|---|
| 3,662,401 | 5/1972 | Collins et al. | 395/650 |
| 4,780,821 | 10/1988 | Crossley | 395/650 |
| 4,939,509 | 7/1990 | Bartholemew et al. | 340/717 |

OTHER PUBLICATIONS

Microsoft Press Computer Dictionary, 1991, p. 82.
M. Altenhofen, et al., "Upgrading a Window System for Tutoring Functions," Nov. 1990.
M. Altenhofen, "Expansion of a Window System for Tutoring Purposes," ch. 4, Jan. 12, 1990, (English translation of German thesis).
*A Comparison of Application Sharing Mechanisms in Real-Time Desktop Conferencing systems,* Conf. on Office Information Systems, ACM SIGOIS Bulletin, vol. 11, Nos. 2, 3; pp. 238-248 (1990) Ahuja et al.
*The Rapport Multimedia Conferencing System,* Conference on Office Information Systems, ACM Press No. 611880 pp. 1-8, (1988) Ahuja, et al.
*The Rapport Multimedia Conferencing System,* J. R. Ensor et al. Second IEEE Conf. on Computer Workstations IEEE Computer Society Press No. 87-80440 pp. 52-58 (1988).
*The X Window System,* by R. W. Scheifler et al. ACM Transactions on Graphics, vol. 5, No. 2; pp. 79-109 (1986).

*Primary Examiner*—Thomas M. Heckler
*Attorney, Agent, or Firm*—Jeffrey D. Myers; Deborah A. Peacock

[57] ABSTRACT

Method and apparatus permitting the collaborative use of a computer application program simultaneously by multiple users at different stations. The method is useful with communication protocols having client/server control structures. The method of the invention requires only a sole executing copy of the application program and a sole executing copy of software comprising the invention. Users may collaboratively use a set of application programs by invoking for each desired application program one copy of software comprising the invention.

20 Claims, 2 Drawing Sheets

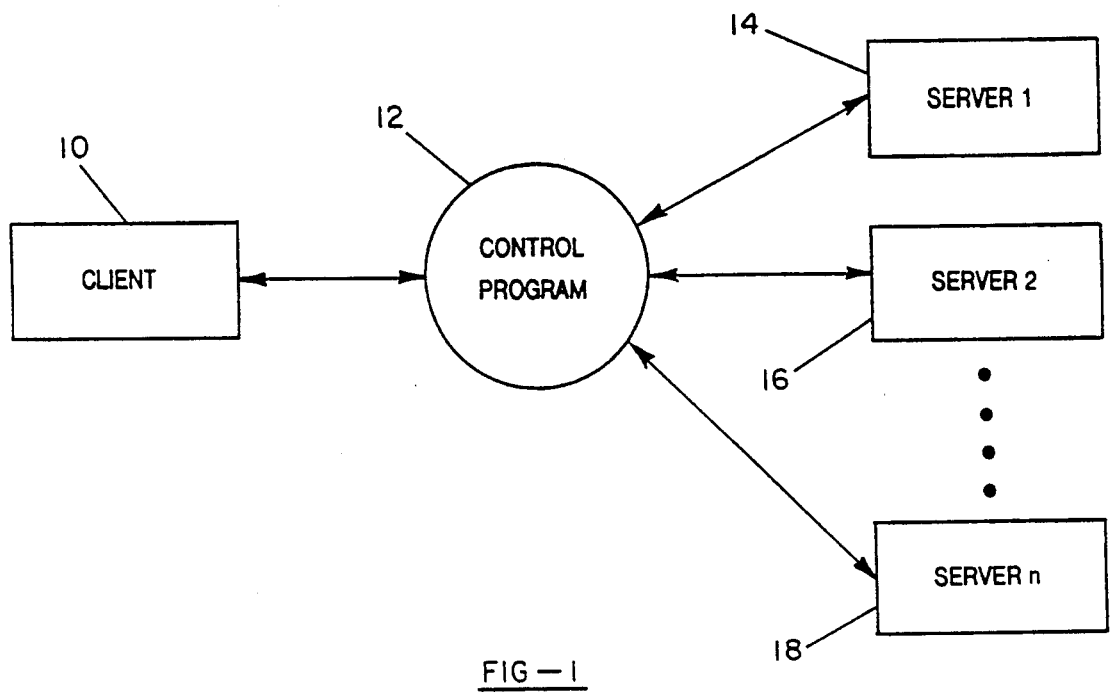
FIG—1
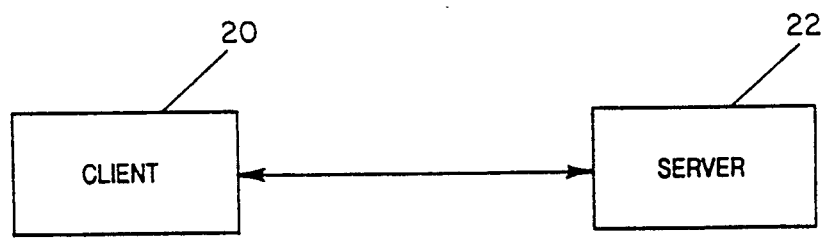
PRIOR ART
FIG—2

METHOD AND APPARATUS FOR COLLABORATIVE USE OF APPLICATION PROGRAM

BACKGROUND OF THE INVENTION

1. Field of the Invention (Technical Field)

The present invention relates to a method and an apparatus permitting users physically located before different input/output devices to use collaboratively and simultaneously a single executing copy of an application computer program. The method of the invention may be employed with any communication protocol employing a clientserver control structure.

2. Background Art

In modern society, it has become increasingly important to permit individuals to work together while separated by distance from one another; hence the development of the telegraph, telephone, teleconferencing systems, facsimile machines, and computer networks. In a society increasingly dominated by the access, creation, and sharing of information, the computer has become an important tool in the day-today activities of workers in all segments of industry. Problems arise today when two or more employees working on a project together using computers must travel away from each other. Typically, the employees work separately on aspects of the common project, communicate their results by phone and/or computer, and eventually merge their separate work in some manner.

Most existing computer application programs are designed for use either by a single user or a group of users physically located before a single station having a single set of input/output devices. Application programs intended for simultaneous collaborative use must contain tailor-made computer instructions permitting such use. If an existing single-user program is to be converted to permit simultaneous collaborative use, the program must be rewritten at an enormous expenditure of time and resources.

Two approaches exist addressing this problem. The first approach, disclosed in U.S. Pat. No. 4,939,509, entitled "Data Conferencing Arrangement for Stations Having Keyboards and Displays, Using a Keyboard Buffer and a Screen Buffer," to Bartholomew et al., is non-general in that each user station must have no more and no fewer input/output devices than a display screen and a keyboard and in that the approach requires that the control means access keyboard buffers and screen buffers. The control software under this approach must be substantially rewritten for each operating system under which it would run. Furthermore, the approach provides no means for users to collaboratively use a plurality of application programs.

A second approach requires special control software executing separately for each station engaging in collaborative use of an application program. See S. R. Ahuja et al., "A Comparison of Application Sharing Mechanisms in Real-Time Desktop Conferencing Systems," Conference on office Information Systems, Apr. 25-27, 1990, ACM SIGOIS Bulletin, Vol. 11, Nos. 2 and 3, pp. 238-48; S. R. Ahuja et al., "The Rapport Multimedia Conferencing System," Conference on office Information Systems, Mar. 23-25, 1988, ACM Press Order Number 611880, pp. 1-8; J. R. Ensor et al., "The Rapport Multimedia Conferencing System—A Software Overview," Second IEEE Conference on Computer Workstations, IEEE Computer Society Press Catalog Number 87-80440, pp. 52-58. While this separate control software permits greater flexibility than provided by the method of the present invention, it requires substantial additional overhead processing for each station and is concomitant greater potential for errors to be introduced in the collaborative use.

The present invention permits physically isolated employees to collectively work using a single executing copy of any application program they are employing to do their work. The employees simultaneously see the output from the application. Each can manipulate data using the application to add new elements to the work, correct mistakes of colleagues, or make comments to the other collaborators. The employees may also simultaneously use more than a single application program collaboratively, for instance a CAD program to design a "widget," a desktop processing (DTP) program to edit a user manual for the widget, and a conferencing program to exchange comments.

SUMMARY OF THE INVENTION (DISCLOSURE OF THE INVENTION

The present invention comprises a method and apparatus for interactively linking a preselected computer application program with a plurality of preselected stations comprising (a) invoking a sole executing copy of a control program for communicating output commands from the application program to the stations and for communicating input signals from users of the stations to the application program; (b) specifying to the control program the stations to be interactively linked; and (c) directing the application program to communicate with the control program.

In the preferred embodiment, the control program communicates with the application program as a server to a client and communicates with the stations as a client to servers, employing a communication protocol such as the X Windows communication protocol. The control program receives an initialization data stream from the application program, passes the initialization data stream to each station, receives an initialization response from each station, returns a sole initialization response to the application program, passes output requests from the application program to each station, and passes input events from the stations to the application program. The highest common input and output capabilities of the stations is determined in returning the sole initialization response to the application program. The control program may comprise software or firmware.

With the present invention, a plurality of preselected computer application programs may be linked with a plurality of preselected stations by invoking, for each of the application programs, a single executing copy of the control program, specifying to each executing copy of the control program the stations to be interactively linked, and directing each application program to communicate with a corresponding single executing copy of the control program.

A primary object of the invention is to permit simultaneous collaborative use of an application program by users at different locations.

Another object of the invention is to permit simultaneous collaborative use of a plurality of application programs.

A primary advantage of the invention is that application programs need not be modified to permit collaborative use.

Another advantage of the invention is that the control program need not be substantially changed in order to function on new computers or with new operating systems because the control program employs an established communication protocol language.

An additional advantage of the invention is that it as not limited to providing collaboration for stations consisting of a keyboard and a screen display; the collaborating stations may have any combination of input and output devices permitted by the communication protocol employed.

Yet another advantage of the invention is that overhead processing is minimized and output consistency between collaborating stations is maximized in that a sole control program provides the collaboration capability for each application rather than a plurality of control programs.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

FIG. 1 is a block diagram illustrating the preferred method and apparatus of the invention;

FIG. 2 is a block diagram illustrating the prior art interaction between a single-user application program and a station.

Figure 3:
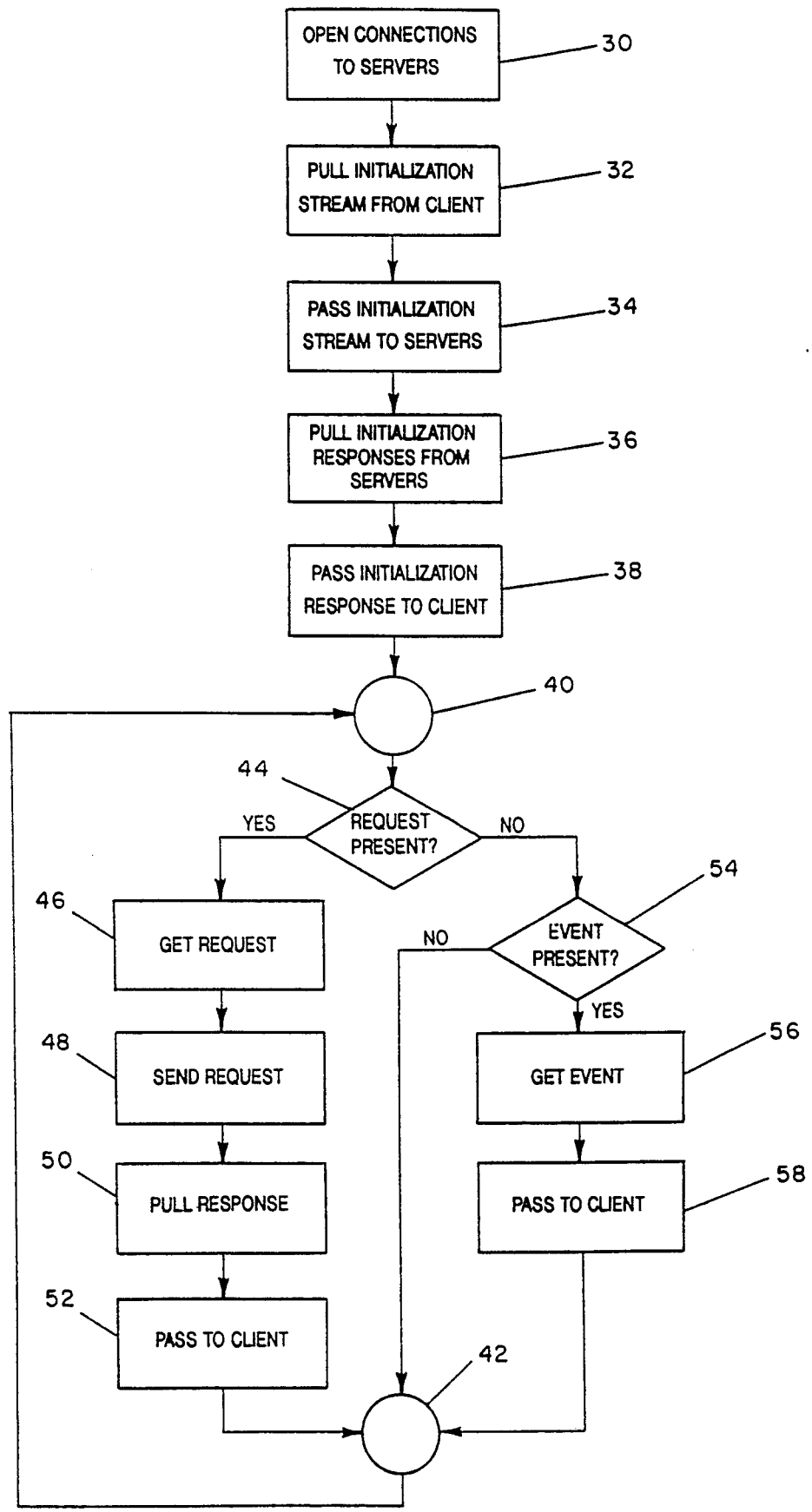
FIG. 3 is a flowchart illustrating the preferred method of the invention.

DESCRIPTION OF THE PREFERRED EMBODIMENTS (BEST MODES FOR CARRYING OUT THE INVENTION)

The method and apparatus of the present invention for collaborative use of an application program comprise a method and software and associated hardware giving to users of an application program the capability to simultaneously and collaboratively use the application program from different physical sites. The application program need not be modified in any manner. The invention permits, for example, three engineers sitting before workstations (each workstation comprising a display, speaker, mouse and keyboard) in three different cities to collectively use a single executing copy (located on a computer in a fourth city) of a computer-aided design (CAD) package to design a widget.

Throughout the specification and claims, the following terms are defined as follows: "Input device" means any device used to send digitally encoded signals to a computer, including, but not limited to, a keyboard, mouse, trackball, microphone, joystick, touch sensitive screen, electronic tablet, external storage device, and facsimile receiving device. "Output device" means any device used to receive digitally encoded signals from a computer, including, but not limited to, a screen display, printer, speaker, external storage device, object manipulation device (such as a robot arm) and facsimile sending device. "Station" means any device used to send and/or receive digitally encoded signals to and/or from a computer, the device comprising none or more input devices and none or more output devices, including, but not limited to a teletype, display terminal, personal computer, and workstation. "Client" means an application program designed to communicate with stations by means of a device-independent communications protocol, for example, an application protocol compatible with the X Window System designed by the Massachusetts Institute of Technology (see R. W. Scheifler and J. Gettys, "The X Window System," ACM Transactions on Graphics, Vol. 5, No. 2, April 1986, pp. 79-109). "Server" means computer software designed to multiplex requests from clients to a station and to demultiplex input commands from the station to clients.

In the preferred embodiment, the method and apparatus of the present invention employ a sole executing copy of a control program that routes the output of an application program to each station collaboratively using the application, and routes input from any of the stations to the application program. The application program is "fooled" into thinking that the control program is a single station, whereas each station collaboratively using the application(s) communicates with the control program as if it were an application program.

In the preferred embodiment, the control program employs the X Window communications protocol to communicate with both application programs, known as clients, and stations, known as servers. The X Window System, also known simply as X, is a network-transparent window system. It permits simultaneous execution of applications, each displayed in a separate window on a display screen, each application generating text and graphics in monochrome or color on a bitmap display. The network transparency permits use of application programs running on other computers scattered throughout the network, as if those programs were running on the station with the display. X permits the applications to be device independent, so that they need not be rewritten, recompiled, or relinked to work with new display hardware.

Programs employing X are divided into two major categories: clients and servers. Clients are the application programs such as clocks, calculators, terminal emulators, calendars, text editors, CAD programs, and so forth. Servers are system programs that manage input and output devices located on a station. They provide management services to those clients that contact them. Each server comprises two main sections of code: a device independent section that communicates with clients and manages data structures used internally, and a device dependent section that controls the particular input and output devices of the station.

X clients and servers communicate using an artificial language, or communication protocol, called X protocol. The X protocol is not dependent upon a particular hardware platform, operating system, or programming language. Clients use X protocol to have servers generate output on a station (such as make a beep, draw a line, or close a window) by issuing "requests" to the station's server. Servers send responses, announce input events (such as a mouse button click, keystroke, or sound input), and send error messages to clients using X protocol commands as well.

Servers usually run on a computer within the station it serves. Clients may or may not be executing on that same computer. If the client as running on another computer, a network transport protocol such as TCP/IP or DECNet® is used to move requests, responses, input events, and error messages between the server's computer and the client's. For purposes of the present invention, many network transport protocols, known in the art, are suitable.

FIG. 2 illustrates the prior art interaction between a singleuser client 20 and a server 22. FIG. 1 illustrates the preferred embodiment of the method and apparatus of the present invention to provide interaction between a single-user client 10 and a plurality of servers 14 and 16 through 18, the total number of servers being 2 to n. The control program 12 of the present invention acts as the intermediary between client 10 and servers 14 and 16 through 18. Control program 12 looks to client 10 as if control program 12 is an ordinary X server and to servers 14 and 16 through 18 as if control program 12 is a single-user X client.

The preferred embodiment of the method of the present invention, embodied in the control program comprising the apparatus of the present invention, is illustrated by the flowchart of FIG. 3. The embodiment manages the collaborative use of an application program by a plurality of stations. Connections are opened 30 to the servers collaborating in the use of the client. An initialization stream is then pulled from the client 32. The initialization stream is passed to each collaborating server 34 and the responses from each server are pulled 36. A single initialization response is passed to the client 38. A loop from start 40 to end 42 is then executed repeatedly, the loop comprising the following steps: If a client request is present 44, then the request is obtained 46, sent to the servers 48, a response pulled 50, and the response is passed to the client 52. If a client request is not present 44, then if a server event is present 54, then the event is obtained 56 and passed to the client 58.

As noted previously, the preferred embodiment of the present invention employs the X Window protocol. Under X protocol, a given server is capable of supporting several client connections simultaneously. As a consequence, many different clients may be making requests of the server at any given point in the server's execution life. Additionally, the server is managing many, usually hundreds, of input/output entities for each client. As an example, a display window associated with a given client is commonly made up of many subwindows. The client and server must be able to mutually identify each subwindow. The client names the entities as they are created, but the server first establishes rules for legal names, or resource identifiers (IDs), for the given client-server interactions. Otherwise, each client connected to a server would need to take into account other clients that might be simultaneously making requests of the server to avoid entity naming conflicts. Since the server controls the "name-spaces" associated with each client, none of the clients needs to be aware of any other client connected to the server.

Under the X protocol, on initialization a client announces what byte order and what version of the X protocol it will use. Each server responds with information on its associated input and output devices as well as resource identifier name-spaces ill use. Because the client only expects to receive a sole initialization response, the control program of the invention must accept the initialization responses of all collaborating servers, determine the highest common input and output capabilities of the various stations served by the servers, and return a sole response to the client. The control program must retain the name-space information passed by each server, however. As the control program receives client requests that include one or more resource IDs, the control program must pass those requests to each collaborating server using the resource ID name-space specified by each server. This name-space transformation may be accomplished by a translation table lookup, the translation table being established based upon all initialization responses by the collaborating servers.

In the preferred embodiment, the control program of the invention is biased toward processing client requests before server events. The biasing may alternatively process server events first or may employ a round-robin scheme. Additionally, the control program can process output requests and input events for any type of input-/output device for which provision has been made in the X Windows protocol, not only keyboards, display screens, and mice.

The preferred embodiment provides no additional means for correcting errors in transmission or receipt of output requests by clients. However, most application programs provide means for refreshing screen displays. If one collaborating station acquires garbled output, the user of the station can issue a command to the application using an input device that will cause the application to refresh the screen displays of all collaborating users.

The preferred embodiment provides a straightforward way to collaboratively use a plurality of application programs. One of the collaborating users simply invokes the execution of one copy of the control program for each client application program to be used collaboratively, and specifies to each copy of the control program the same set of servers/stations.

The apparatus of the invention is a computer executing a program embodying the method of the invention. The program may be either software or firmware residing on any device accessible to the computer.

The following examples of the use of the invention demonstrate its utility: Two coemployees may wish to collaborate at a distance on a paper destined for publication in a scholarly journal. One employee is at her place of work using a workstation. The other is using a laptop computer with a modem and is on a cross-country flight. The laptop user connects by modem to a minicomputer at his place of work, which is in turn connected by network to his colleague's workstation. The laptop user sends an electronic message to the workstation stating that he is about to begin a collaborative session. He invokes the execution of a copy of the control program of the invention on the minicomputer and specifies to the control program the network addresses of the servers he and his colleague are employing and directs a chosen client text editor to communicate with the control program. Both employees see the same display and may both modify the text of the paper they are working on.

In the second example, four military officers seek to collaboratively use a program providing a operational-level military simulation of the battle of Waterloo. The program is designed to receive commands from only one station, but the officers are in four different offices before four different workstations. One is to control the French forces (blue), one the British (red), one the Prussian (green), and one the Allied (orange). When all are ready to begin, one officer invokes a copy of the control program and specifies to it the program providing the simulation and each of the servers coordinating input and output for each of the officers' workstations. The four may use the program just as they would if they sat clustered around a single workstation.

In the third example, a design engineer, a safety engineer, and a structural engineer seek to collaboratively work on a CAD description of a widget, to edit a set of production instructions, and to exchange comments with each other. Again, the engineers are physically separated, each before a color workstation. One engineer begins the session by invoking three copies of the control program of the invention. Each is given the same set of collaborating servers, but each is given a different application program as its client. One client is a CAD package, another is a text editor, and another is a message exchange or notepad program. The engineers may each work on any of the three application programs, and each see the results of the others' activity.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A method for interactively linking a computer application program with a plurality of stations on which one or more types of operating system are executing, the method comprising the steps of:
   a) invoking on a coordinating computer a sole executing copy of a control program for communicating output commands from the application program to the stations and for communicating input signals from users of the stations to the application program, the control program being discrete from operating system programs executing on the coordinating computer and functioning independently of which types of operating system are executing on the plurality of stations;
   b) specifying to the control program the stations to be interactively linked; and
   c) directing by software command the application program to communicate with the control program.

2. The invention of claim 1 wherein invoking a control program comprises invoking a control program which communicates with the application program as a server to a client and communicates with the stations as a client to servers.

3. The invention of claim 2 wherein invoking a control program comprises invoking a control program which communicates with the application program and the stations using X Windows communication protocol.

4. The invention of claim 1 wherein invoking a control program comprises invoking a control program which embodies a method comprising the steps of:
   a) receiving an initialization data stream from the application program;
   b) passing the initialization data stream to each station;
   c) receiving the initialization response from each station;
   d) returning a sole initialization response to the application program;
   e) passing output requests from the application program to each station; and
   f) passing input events from the stations to the application program.

5. A method for interactively linking a plurality of computer application programs with a plurality of stations on which one or more types of operating system are executing, the method comprising the steps of:
   a) for each of the application programs, invoking on a coordinating computer a single executing copy of a control program for communicating output commands from a corresponding application program to the stations and for communicating input signals from users of the stations to the corresponding application program, the control program being discrete from operating system programs executing on the coordinating computer and functioning independently of which types of operating system are executing on the plurality of stations;
   b) specifying to each executing copy of the control program the stations to be interactively linked; and
   c) directing by software command each application program to communicate with a corresponding single executing copy of the control program.

6. The invention of claim 5 wherein invoking a control program comprises invoking a control program which communicates with the application program as a server to a client and communicates with the stations as a client to servers.

7. The invention of claim 7 wherein invoking a control program comprises invoking a control program which communicates with the application program and the stations using X Windows communication protocol.

8. The invention of claim 5 wherein invoking a control program comprises invoking a control program which embodies a method comprising the steps of:
   a) receiving an initialization data stream from the corresponding application program;
   b) passing the initialization data stream to each station;
   c) receiving an the initialization response from each station;
   d) returning a sole initialization response to the corresponding application program;
   e) passing output requests from the corresponding application program to each station; and
   f) passing input events from the stations to the corresponding application program.

9. A method for interactively linking a computer application program with a plurality of stations on which one or more types of operating system are executing, said apparatus comprising:
   means for invoking on a coordinating computer a sole executing copy of a control program for communicating output commands from the application program to the stations and for communicating input signals from users of the stations to the application program, said control program being discrete from operating system programs executing on the coordinating computer and functioning independently of which types of operating system are executing on the plurality of stations;
   means for specifying to said control program the stations to be interactively linked; and means for directing by software command the application program to communicate with said control program.

10. The invention of claim 9 wherein said means for invoking a control program comprises means for invoking a control program which communicates with the application program as a server to a client and communicates with the stations as a client to servers.

11. The invention of claim 10 wherein said means for invoking a control program comprises means for invoking a control program which communicates with the application program and the stations using X Windows communication protocol.

12. The invention of claim 9 wherein said means for invoking a control program comprises means for invoking a control program comprising:
    means for receiving an initialization data stream from the application program;
    means for passing the initialization data stream to each station;
    means for receiving an the initialization response from each station;
    means for returning a sole initialization response to the application program;
    means for passing output requests from the application program to each station; and
    means for passing input events from the stations to the application program.

13. The invention of claim 9 wherein said control program comprises software.

14. The invention of claim 9 wherein said control program comprises firmware.

15. An apparatus for interactively linking a plurality of computer application programs with a plurality of stations on which one or more types of operating system are executing, said apparatus comprising:
    for each of the application programs, means for invoking on a coordinating computer a sole executing copy of a control program for communicating output commands from a corresponding application program to the stations and for communicating input signals from users of the stations to the corresponding application program, said control program being discrete from operating system programs executing on the coordinating computer and functioning independently of which types of operating system are executing on the plurality of stations;
    means for specifying to each executing copy of said control program the stations to be interactively linked; and
    means for directing by software command each application program to communicate with a corresponding single exceeding copy of said control program.

16. The invention of claim 15 wherein said means for invoking a control program comprises means for invoking a control program which communicates with the corresponding application program as a server to a client and communicates with the stations as a client to servers.

17. The invention of claim 16 wherein said means for invoking a control program comprises means for invoking a control program which communicates with the corresponding application program and the stations using X Windows communication protocol.

18. The invention of claim 15 wherein said means for invoking a control program comprises means for invoking a control program comprising:
    means for receiving an initialization data stream from the corresponding application program;
    means for passing the initialization data stream to each station;
    means for receiving an the initialization response from each station;
    means for returning a sole initialization response to the corresponding application program;
    means for passing output requests from the corresponding application program to each station; and
    means for passing input events from the stations to the corresponding application program.

19. The invention of claim 15 wherein said control program comprises software.

20. The invention of claim 15 wherein said control program comprises firmware.

* * * * *